United States Patent [19]

Howell et al.

[11] Patent Number: 5,361,889

[45] Date of Patent: Nov. 8, 1994

[54] APPARATUS FOR MERGING MULTIPLE LANES OF PRODUCT

[75] Inventors: Kenneth A. Howell; William R. Vowell; John W. Higgison, all of Macon, Ga.

[73] Assignee: Brown & Williamson Tobacco Corporation, Louisville, Ky.

[21] Appl. No.: 123,423

[22] Filed: Sep. 17, 1993

[51] Int. Cl.5 ............................................ B65G 47/10
[52] U.S. Cl. ..................... 198/357; 198/360; 198/368; 198/451; 198/531
[58] Field of Search ............... 198/357, 358, 359, 360, 198/362, 368, 370, 448, 451, 531

[56] References Cited

U.S. PATENT DOCUMENTS

| | | | |
|---|---|---|---|
| 2,171,922 | 9/1939 | Duval et al. | 198/435 X |
| 3,894,625 | 7/1975 | Boyle et al. | 198/357 |
| 4,010,841 | 3/1977 | Bonzack | 198/531 X |
| 4,986,408 | 1/1991 | Carter et al. | 198/368 |
| 5,217,101 | 6/1993 | Raschka | 198/368 X |

Primary Examiner—Cheryl L. Gastineau
Attorney, Agent, or Firm—Charles I. Sherman

[57] ABSTRACT

An apparatus for merging two or more parallel conveyor lanes of product into one final lane includes a pair of parallel conveyors, one disposed above and in spaced relationship over the other. A pivotally mounted slide at the discharge end of the first conveyor feeds product from the first conveyor to the second conveyor. A timing member is pivotally mounted above the second conveyor for engagement with product flowing along the second conveyor at a preselected position beneath the discharge end of the slide and upon engagement with product on the second conveyor simultaneously engages with the slide to force the slide out of a feeding position. The slide is provided with at least one lifting tab thereon for engaging with at least one arm of a pivotally attached stop member whereby engagement or disengagement of the tabs with the arm of the stop member determines the position of the stop member in relationship with product moving along the first conveyor.

4 Claims, 3 Drawing Sheets

APPARATUS FOR MERGING MULTIPLE LANES OF PRODUCT

BACKGROUND OF THE INVENTION

1. Field of the Invention

This invention is directed to an apparatus for handling packages, particularly cartons of cigarettes. More particularly, this invention is directed to an apparatus for the merging of products from two conveyors wherein the conveyors are in parallel and one is spaced above the other.

2. Description of the Prior Art

In the manufacturing industry and particularly in the transportation of products from a plurality of machines to a common point for further processing, conveying systems for such purpose are well know. For example, in the cigarette manufacturing industry such transport or conveying systems include conveying individual packages from a plurality of packaging machines into a multi-package container such as a cigarette carton, or the transportation of cigarette cartons from a plurality of machines to a shipping container. In the conveying sequence, the packages or cartons coming from the plurality of machines are merged into a single product line. And, many different types of devices are known in the art wherein a plurality of first transporting or conveying means are merged into a second conveying means so that all of the product from several sources are merged into a single conveying line.

For example, U.S. Pat. No. 4,986,408 teaches an apparatus for handling rod like articles, particularly cigarettes or filter rods, which includes a conveyor arrangement comprising upper and lower band conveyors which convey a multi-layered stream of product from a delivery device to a conjunction device, wherein a downwardly extending path between the delivery device and the conjunction device is utilized. Sensing means and a closure device are arranged adjacent to the junction for controlling the flow from the upper conveyor to the lower conveyor.

U.S. Pat. No. 3,894,625 teaches a lumber sorting system with overhead infeed and includes a by-pass conveyor including a diverter arm capable of pivoting between the diverting position and an inactive position for controlling boards coming from an upper conveyor on a transition conveyor and then to a lower conveyor. When the diverter arm is in its inactive or non-diverting position, boards from the upper conveyor are allowed to descend along an infeed conveyor system to the lower conveyor.

SUMMARY OF THE INVENTION

The present invention is an improved apparatus for merging multiple lanes of product and especially the merging of cartons of cigarettes coming from a plurality of sources into a single conveying line for transporting to a means to stack cartons into a shipping container. Further, the present invention relates to an apparatus for merging products from one conveyor to a second conveyor wherein the conveyors are in parallel relationship with one of the conveyors being spaced directly above the other conveyor. Even further, the present invention provides an apparatus for merging lanes of products from one conveyor to another conveyor which is relatively inexpensive, simple in cost and economical to operate.

More particularly the present invention is directed to an apparatus for merging multiple lanes of products comprising a first conveyor and a second conveyor disposed in spaced parallel relationship with the first conveyor being directly above the second conveyor; and, a product transition zone connecting the first conveyor to the second conveyor, the product transition zone including means to merge products from the first conveyor to the second conveyor, the means to merge products from the first conveyor to the second conveyor including a product path connecting the first conveyor to the second conveyor and means to stop the first conveyor in response to preselected operating conditions of the second conveyor.

The foregoing objects, as well as features and advantages of the present invention will become more apparent from the following description with reference to the accompanying drawings.

DETAILED DESCRIPTION OF THE PREFERRED EMBODIMENT

Figure 1:
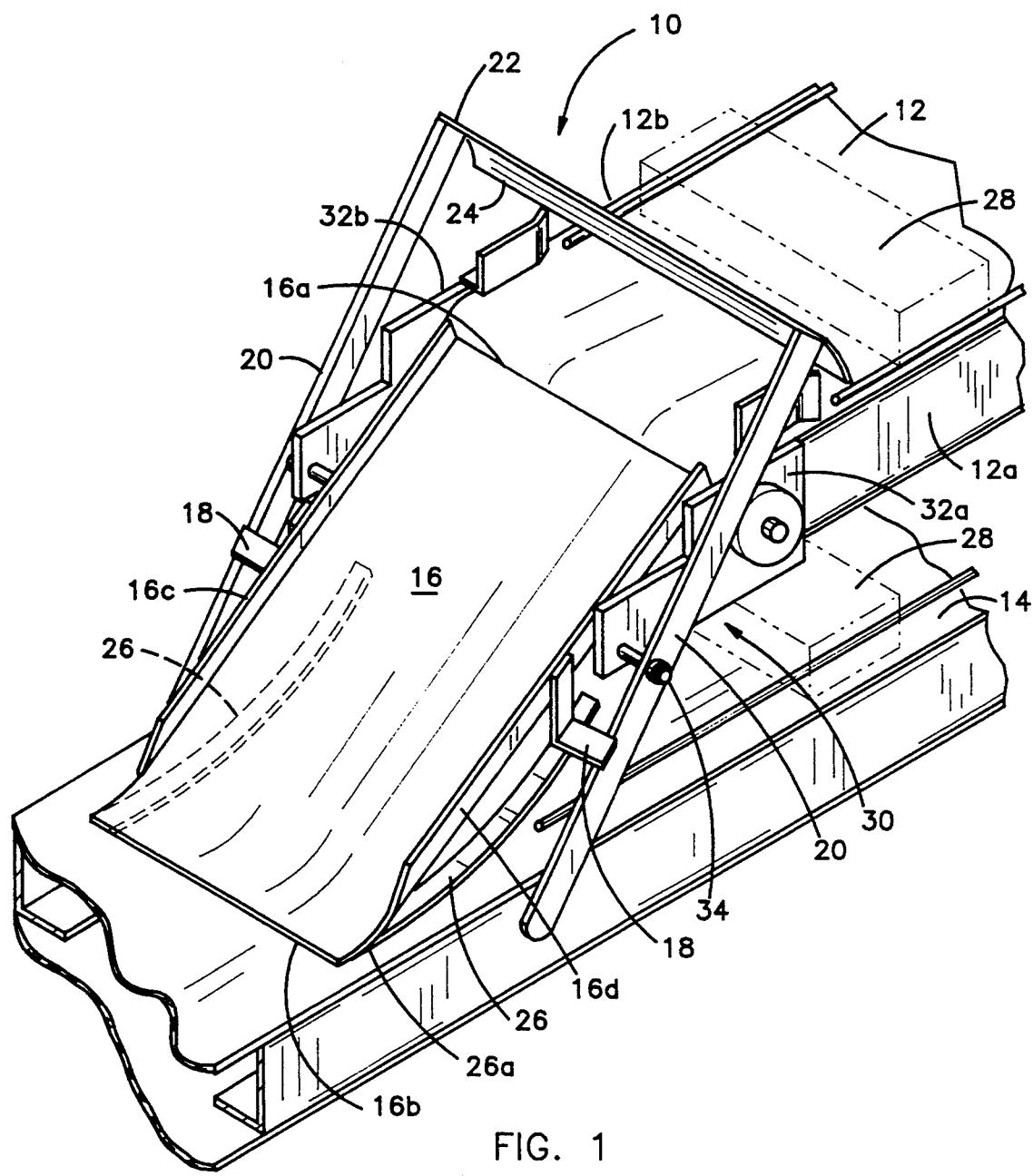
FIG. 1 is a perspective view with of a preferred embodiment of the present invention.
Figure 2:
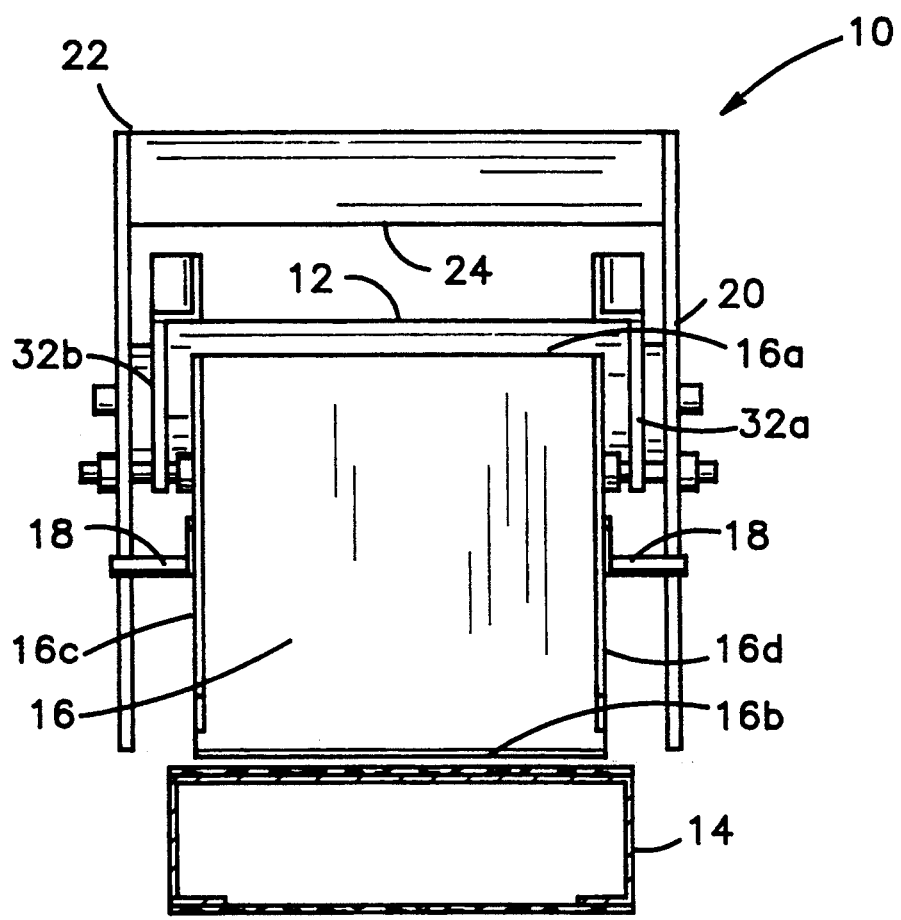
FIG. 2 is a front elevational view of the present invention of FIG. 1.

As shown in the Figures, an apparatus 10 for merging multiple lanes of product includes a first conveyor 12 and a second conveyor 14. The first and second conveyors, 12 and 14, respectively, are endless conveyors and the first conveyor 12 is disposed parallel to and directly above the second conveyor 14. A slide 16 is provided at the end of the conveyor 12. The slide 16 includes a feed end 16a which is in flow communication with the first conveyor 12 and a discharge end 16b which is positioned in alignment and flow communication with the second conveyor 14. The slide 16 may be of generally channel-shaped construction with spaced sides 16c and 16d thereon disposed to maintain product on the slide 16 as it is transferred from the first conveyor 12 to the second conveyor 14. Moreover, the slide 16 is generally of the same width or slightly narrower than the conveyors 12 and 14.

Figure 3:
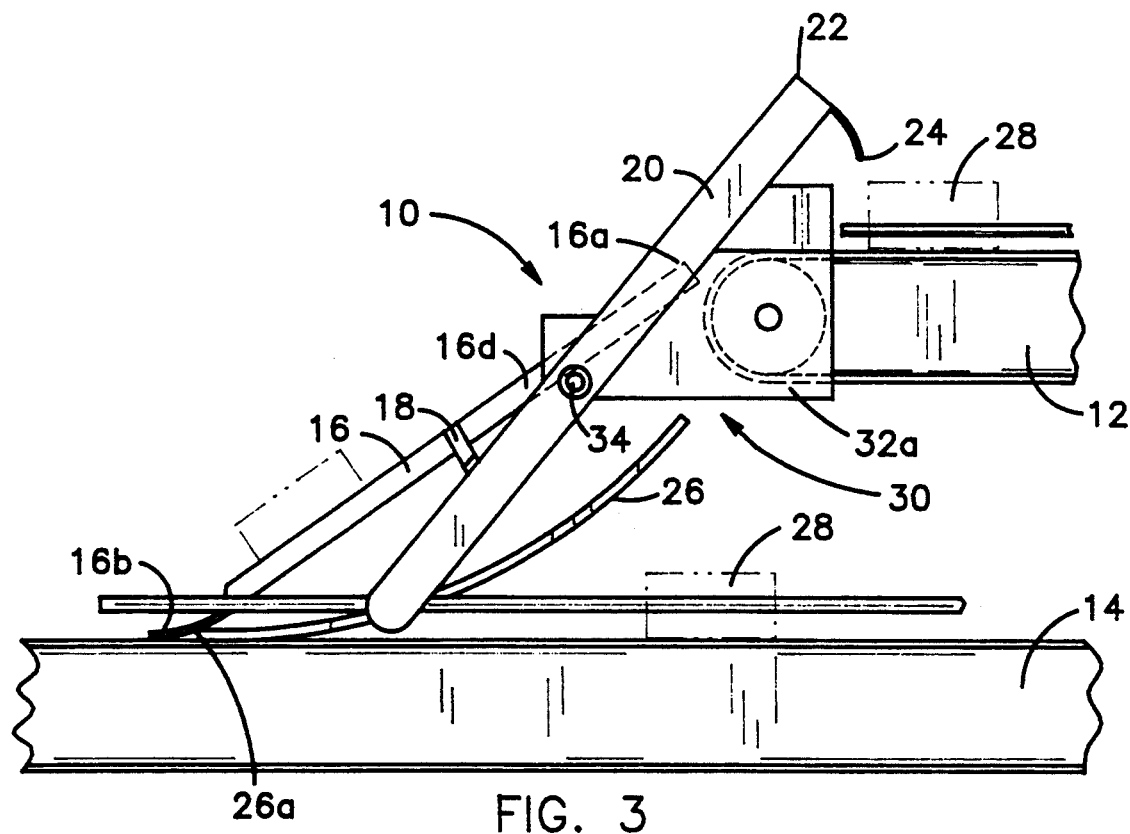
FIG. 3 is a side elevational view of the present invention of FIG. 1 showing the apparatus in a merging position from one conveyor to another conveyor; and, FIG. 4 is a side elevational view of the present invention of FIG. 1 showing the apparatus in a non-merging position from one conveyor to another conveyor.
Figure 4:
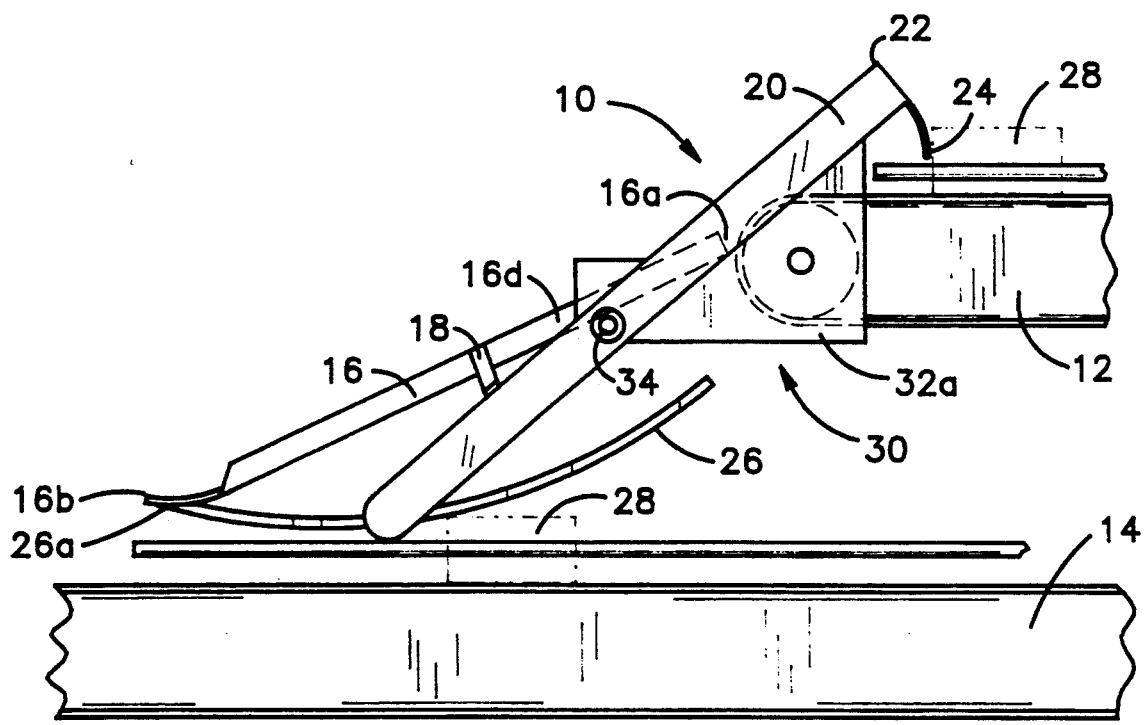

Slide 16 is also provided for pivotal movement between a first discharge position (FIG. 3) and a second position (FIG. 4) wherein product is prevented from being fed from conveyor 12 to conveyor 14. The slide 16 is pivotally mounted by a mounting bracket 30 which includes spaced flat plate members 32a and 32b which are attached to and extend outwardly from the ends of sides 12a and 12b of conveyor 12. An elongated pivot rod 34 extends through plate members 32a and 32b and transversely through the bottom of slide 16 providing for pivotal movement of slide 16.

A timing member 26 which is an arcuate shaped plate is mounted above the second conveyor 14 wherein the end 26a of timing member 26 is attached, by for example welding, to the slide 16 at the discharge end 16b. Timing member 26 is moveable in response to engagement with product 28, such as a carton of cigarette packs, at a preselected point on conveyor 14. Upon engagement with the cigarette carton 28, the end 26a moves against the discharge end 16b thereby forcing discharge end 16b and in turn slide 16 in an upward direction.

An L-shaped stop member 22 is also pivotally attached to pivotable mounting bracket 30 for stopping the movement of product 28 along the first conveyor 12 whenever product 28 is moving along the second conveyor 14 beneath the discharge end 16b of slide 16. The L-shaped stop member 22 is provided with a pair of discharge lifting arms 20 on opposite sides of the slide 16. Arms 20 are positioned for engagement with lifting tabs 18 on opposite sides of the slide 16. At the end of the L-shaped stop member 22 which extends above conveyor 12 is a stop end 24 which is a transversely extending member fixedly at each end thereof to the upper extremity of the spaced arms 20. When the L-shaped stop member 22 is pivoted downwardly in response to engagement between arms 20 and tabs 18, the stop end 24 moves upwardly thereby allowing for the passage of product 28 on the conveyor 12 to pass beneath the stop end 24 onto slide 16.

In operation, product 28 travels along the first conveyor 12 and the second conveyor 14. Product 28 which is being discharged, usually intermittently from a packaging machine, is generally spaced along the conveyors 12 and 14. And, packages moving along the bottom or second conveyor 14, engage with the timing member 26 thereby forcing the pivotally mounted timing member 26 into a position whereby the slide engaging end 26a is forced upwardly and into contact with the discharge end 16b of the slide 16. When the slide 16 pivots upwardly the lifting tabs 18 are disengaged from the lifting arms 20 on the stop member 22 and the position of the pivot point and the weight of the stop end 24 causes the stop member to pivot so the stop end 24 is at its downward extremity across the width of conveyor 12 holding back any product 28 which comes in contact therewith. Member 26 is positioned, for example, to permit product 28 on first conveyor 12 having passed the location of stop end 24 to transit slide 16 and pass onto conveyor 14 before product 28 on second conveyor 14 passes under discharge end 16b of slide 16, thereby preventing product stacking.

As long as product 28 continues to move along the second conveyor 14, stop end 24 will be in its downward position thereby holding packages 28 from further movement downstream along conveyor 12. However, as soon as the movement of packages underneath the second conveyor 14 ceases engagement with timing member 26, the slide 16 will return to its feed position as the lifting tabs 18 engage the lifting arms 20 thereby pivoting stop end 24 upwardly. The packages 28 traveling along conveyor 12 then pass underneath the stop end 24 and toward the feed end 16a of the slide 16. As the flow of product along conveyors 12 and 14 are intermittent, there is continual pivotable movement of the timing movement 26, the slide 16 and the stop member 22 so that the product from conveyor 12 to conveyor 14 makes for a continual stream of product along conveyor 14 downstream from slide 26.

From the aforementioned description of the preferred embodiment of the present invention, it should become apparent to those skilled in the art that various modifications and arrangements may be made to the embodiment shown and described without departing from the scope and spirit of the present invention.

What is claimed is:

1. An apparatus for merging multiple lanes of products comprising:
   a first conveyor and a second conveyor disposed in spaced parallel relationship, said first conveyor being disposed directly above said second conveyor; and,
   a product transition zone connecting said first conveyor to said second conveyor, said product transition zone including means to merge product from said first conveyor to said second conveyor including a movable slide between said first conveyor and said second conveyor and means to stop product moving along said first conveyor in response to preselected operating conditions of said second conveyor, said means to stop said first conveyor including an elongated movable timing member positioned to engage product along said second conveyor and simultaneously engage with said slide wherein in one position said timing member is engaged with second conveyor product whereby said slide is in a non-feed position and in a second position, said timing member is disengaged from said second conveyor product and said slide is in a feed position from said first conveyor to said second conveyor.

2. The apparatus of claim 1, said moveable slide being positioned to feed said product from said first conveyor in one position, and to prevent the movement of product from said first conveyor to said second conveyor in a second position.

3. The apparatus of claim 1 wherein said moveable slide is provided with at least one lifting arm on the side thereof aligned for engagement with a lifting arm on a stop member, said stop member including stop means on one end thereof for engagement with product on said first conveyor.

4. The apparatus of claim 3 wherein said stop member is of L-shaped configuration having a pivotally attached long leg longitudinally disposed and a transversely disposed short leg at one end thereof wherein the short leg is pivoted in a downward position for engagement with product moving along said first conveyor.

* * * * *